J. G. EGERTON.
AUTOMATIC LIGHTING CONTROL FOR VEHICLES.
APPLICATION FILED MAR. 16, 1914.
1,135,999.
Patented Apr. 20, 1915.
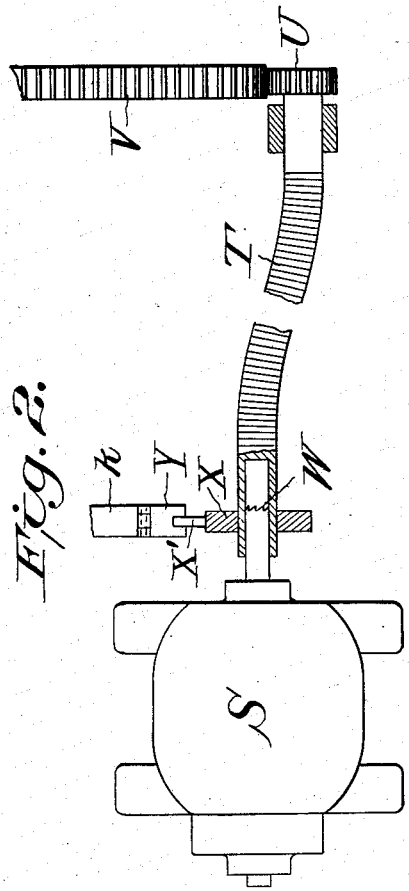
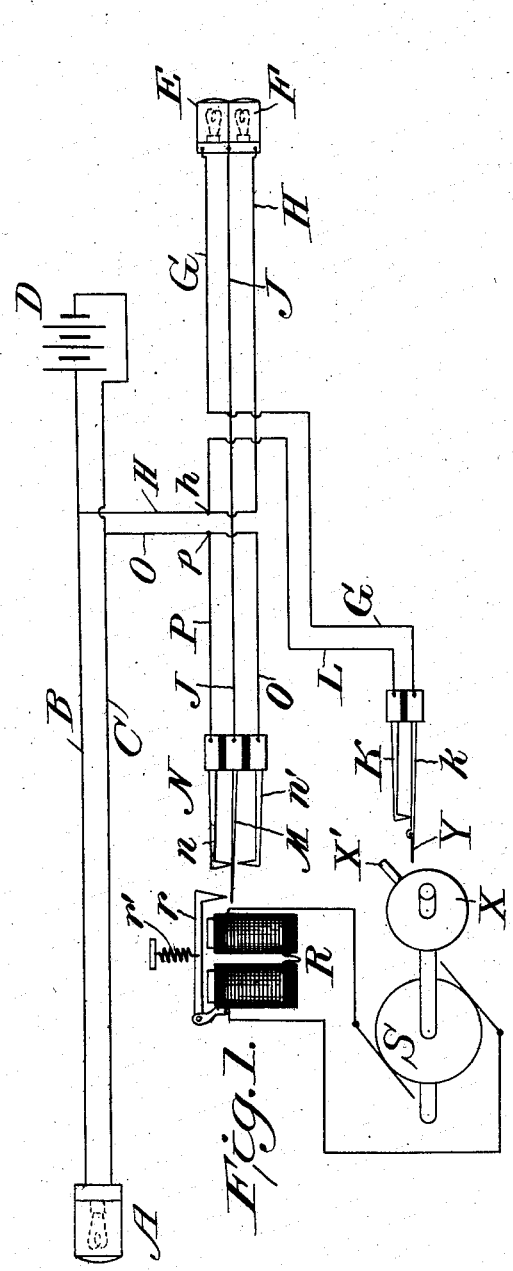
Inventor
J. George Egerton.
Witnesses
C. M. Walker.
E. Williams.
By Chas. E. Riordan
Attorney

UNITED STATES PATENT OFFICE.

JOHN GEORGE EGERTON, OF MEMPHIS, TENNESSEE, ASSIGNOR OF ONE-THIRD TO GRAHAM EGERTON, OF WASHINGTON, DISTRICT OF COLUMBIA.

AUTOMATIC LIGHTING CONTROL FOR VEHICLES.

1,135,999.      Specification of Letters Patent.      Patented Apr. 20, 1915.

Application filed March 16, 1914. Serial No. 825,072.

*To all whom it may concern:*

Be it known that I, JOHN GEORGE EGERTON, a citizen of the United States, residing at Memphis, in the county of Shelby and State of Tennessee, have invented certain new and useful Improvements in Automatic Lighting Control for Vehicles, of which the following is a full, clear, and exact specification.

This invention relates to electric systems for lighting automobiles, that is, for providing the head and tail lights for such vehicles.

One object of the invention is to provide for automatically switching from a red tail light, which is normally shown when the car is standing still, to a green tail light when the car is in motion.

Another object is to automatically cause the red tail light to flash or flicker when the car is moving backward, and a further object is to provide for an uninterrupted flow of current to the head light during all conditions of the tail lights.

The invention will be first hereinafter described in connection with the accompanying drawings, which constitute a part of this specification, and then more specifically defined in the claims at the end of the description.

In the accompanying drawings, in which the same reference characters are used in both views to designate corresponding parts: Figure 1 is a diagrammatic view of my lighting system, showing the circuits to the head and tail lights and the circuit breakers in the circuits of the tail lights, and Fig. 2 is an enlarged plan view of the dynamo and its driving connection with a gear on the front wheel of the automobile.

In Fig. 1, A designates the head light and B and C the conductors which place it in direct circuit with the battery D. The red tail light E and green tail light F may be grouped together, as shown, and supplied with current by individual conductors G and H leading from said red and green lights, respectively, and by a common conductor J leading electrically connected to the sockets of both of said lights. Of these three conductors, only one, H, connects direct with one of the main circuit conductors from the battery to the head light, its connection being with the conductor or wire B.

The wire or conductor G leads to a normally closed circuit breaker K, and a return wire or conductor L connects said circuit breaker to the conductor H at *h*. The conductor or wire J leads from the sockets of the tail lights to a spring switch arm M forming a part of a combined circuit making and breaking device N having spaced opposed contacts *n* and *n'*. The resiliency of the arm M normally holds it against the contact *n*. The contact *n'* is connected to the wire or conductor C of the main battery circuit by a conductor or wire O, while a conductor or wire P connects the contact *n* with the conductor O at *p*.

From the foregoing it will be seen that under normal conditions, which exist when the automobile equipped with my system is standing still, the head light and the red tail light will be in circuit, the head light being always in direct circuit with the battery, and the red tail light having its branch circuit from the conductor B through wire H to *h*, thence through wire L to the closed circuit breaker K, and via wire G to the red light, and back via wire J to arm M, to contact *n*, through wire P to *p* and thence through wire O to the other main circuit conductor C. It will also be seen that when the arm M is moved out of contact with the contact *n* and into electric connection with the contact *n'*, the branch circuit to the red light will be broken and a branch circuit will be established to the green light as follows: From the main circuit conductor B through wire H to the green light socket, and back through wire J to arm M, to contact *n'*, and via wire O to the other conductor C of the main circuit.

To automatically move the arm M out of contact with the contact *n* and into contact with the contact *n'*, I provide an electric magnet R having an armature *r* adapted to engage the said arm and move it in the manner stated when the armature itself is attracted by the magnet. Said magnet is normally dead, but as soon as the automobile is started, it is supplied with electricity or energized by current from a dynamo S driven by a flexible shaft T and pinion U from a gear V designed to be mounted on one of the front wheels of the automobile, see Fig. 2. It will thus be seen that as soon as the car is started, the dynamo supplies current which energizes the magnet and the latter attracts the armature which breaks the red light circuit and establishes the green light circuit, so that while running the automobile will display a green tail light, but as soon as it stops the magnet will become dead again and the armature will rise, assisted by a spring r', whereupon the arm M will move upward, under its own resiliency, out of contact with the contact n' and into contact with the contact n.

The connection W between the flexible shaft T and the dynamo is such that the latter will be turned in one direction only, namely when the car is moving forward. I have shown a ratchet connection, but any other suitable connection will answer, it being understood that the dynamo will be driven only when the car is moving forward and not when the car is moving backward.

Mounted on a part of this connection which does turn in both directions is a disk X carrying a radially projecting pin X' arranged in the path of a rule-jointed extension Y of the resilient arm k of the circuit breaker K. When the automobile is moving forward this pin X' will pass the rule-jointed extension Y, simply pushing it aside, but when the car is moving rearward the rule-joint will remain stiff with the result that each time the pin passes the extension the arm k will be moved to break the red light circuit, thereby causing said light to flash or flicker, notifying persons at the rear that the car is backing.

Having thus described my invention, what I claim as new and desire to secure by Letters Patent of the United States is:

1. In apparatus of the character described, the combination with two tail lights of different colors, of a normally open circuit to one of the tail lights, a normally closed circuit to the other tail light, means for breaking the normally closed tail light circuit and closing the normally open tail light circuit when a vehicle equipped with the apparatus is moved forward, whereby differently colored tail lights will be displayed when the vehicle is running in a forward direction and when it is still, and means operated by the vehicle only when the latter is in motion for periodically interrupting the normally closed circuit when the vehicle is moved rearwardly, thereby causing at such times a flashing of the tail light which normally burns when the vehicle is still.

2. In apparatus of the character described, the combination with a circuit including a generator and a lamp, of another circuit including another lamp, one circuit being normally closed and the other normally open, and electrical means depending for its operation upon the motion of a vehicle equipped with the apparatus for breaking the normally closed circuit and closing the normally open circuit when a vehicle equipped with the apparatus is set in motion.

3. In apparatus of the character described, the combination with a circuit including a generator and a danger signal, of another circuit including a safety signal light, the former circuit being normally closed and the latter normally open, and means for breaking the normally closed circuit and closing the normally open circuit when a vehicle equipped with the apparatus is moved forward, and means operated by the vehicle only when the latter is in motion for periodically interrupting the danger lamp circuit when the vehicle is moved rearward.

4. In apparatus of the character described, the combination with a pair of differently colored tail lights, of a normally closed circuit to one of said lights, a normally open circuit to the other light, spaced contacts in different circuits, a movable arm included in both circuits, an electric magnet, an armature adapted to contact with said arm and shift it from one of said spaced contacts to the other, a dynamo for energizing said magnet, driving connection from the running gear of the vehicle for actuating said dynamo when the vehicle is moved forward, whereby differently colored lights will be displayed when the vehicle is moving forward and is still, means for periodically interrupting the normally closed circuit when the vehicle is moved rearwardly, and means for automatically throwing out the driving connection from the running gear to the dynamo when the vehicle is running rearwardly, whereby at such times a flashing is caused of the tail light which normally burns when the vehicle is still.

5. In apparatus of the character described, the combination with a circuit including a generator and a lamp, of another circuit including another lamp, a circuit maker and breaker having two contacts and a common switch arm, the latter being included in both circuits and each circuit including a different one of said contacts, said arm being normally held in contact with one of said contacts to close one circuit while the other circuit is normally open, and electrical means depending for its operation upon the motion of a vehicle equipped with the apparatus for moving said arm into engagement with the other contact to close the normally open circuit and open the normally closed circuit when a vehicle equipped with the apparatus is set in motion.

6. In apparatus of the character described, the combination with a circuit including a generator and a lamp, of another circuit including another lamp, a circuit maker and breaker having two contacts and a common switch arm, the latter being included in both circuits and each circuit including a different one of said contacts, said arm being normally held in contact with one of said contacts to close one circuit while the other circuit is normally open, an electric magnet, an armature therefor arranged in the path of said arm, means for normally holding said armature away from the magnet, and a dynamo to be connected with the running gear of a vehicle equipped with the apparatus for energizing the magnet when the vehicle is started, thereby moving the armature into engagement with the other contact, closing the normally open circuit and opening the normally closed circuit.

7. In apparatus of the character described, the combination with two tail lights of different colors, of a normally open circuit to one of said lights, a normally closed circuit to the other light, and means depending for its operation upon the motion of a vehicle equipped with the apparatus for breaking the normally closed circuit and closing the normally open circuit when the vehicle is set in motion, whereby a differently colored tail light will be displayed when the vehicle is running and when it is still.

In testimony whereof I have signed my name to this specification in the presence of two attesting witnesses.

JOHN GEORGE EGERTON.

Witnesses:
HENRY BORSJE,
IRA M. SAINT.